US010467145B2

(12) United States Patent
Jawahar et al.

(10) Patent No.: US 10,467,145 B2
(45) Date of Patent: Nov. 5, 2019

(54) MANAGEMENT OF CACHING OPERATIONS IN A UNIFIED CACHE

(71) Applicant: Nutanix, Inc., San Jose, CA (US)

(72) Inventors: Anoop Jawahar, Bangalore (IN); Gaurav Jain, Bangalore (IN)

(73) Assignee: NUTANIX, INC., San Jose, CA (US)

( * ) Notice: Subject to any disclaimer, the term of this patent is extended or adjusted under 35 U.S.C. 154(b) by 0 days.

(21) Appl. No.: 15/886,044

(22) Filed: Feb. 1, 2018

(65) Prior Publication Data
US 2019/0236016 A1 Aug. 1, 2019

(51) Int. Cl.
G06F 12/00 (2006.01)
G06F 12/0888 (2016.01)
G06F 12/0802 (2016.01)

(52) U.S. Cl.
CPC ...... G06F 12/0888 (2013.01); G06F 12/0802 (2013.01); G06F 2212/1021 (2013.01); G06F 2212/1041 (2013.01)

(58) Field of Classification Search
CPC ............. G06F 12/0802; G06F 12/0888; G06F 2212/1021; G06F 2212/1041
See application file for complete search history.

(56) References Cited

U.S. PATENT DOCUMENTS

| 5,625,794 | A | * | 4/1997 | Inoue | ................. G06F 12/0866 711/113 |
| 8,549,518 | B1 | | 10/2013 | Aron et al. | |
| 8,601,473 | B1 | | 12/2013 | Aron et al. | |
| 8,850,130 | B1 | | 9/2014 | Aron et al. | |
| 9,772,866 | B1 | | 9/2017 | Aron et al. | |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jan. 12, 2016), from https://nutanixbible.com/.
Poitras, Steven. "The Nutanix Bible" (Oct. 15, 2013), from http://stevenpoitras.com/the-nutanix-bible/ (Publication date based on indicated capture date by Archive.org; first publication date unknown).

(Continued)

Primary Examiner — Shawn X Gu
(74) Attorney, Agent, or Firm — Foley & Lardner LLP

(57) ABSTRACT

An exemplary embodiment herein is a method including comparing a cache hit rate ratio of a unified cache to a first pre-determined threshold, incrementing an alert counter in response to the cache hit rate ratio being lower than the first pre-determined threshold, comparing the alert counter to a pre-determined limit, preventing a first receipt of a type of data by the unified cache in response to the alert counter being equal to the pre-determined limit, causing a second receipt of metadata by the unified cache, comparing the cache hit rate ratio to a second pre-determined threshold, and allowing the first receipt of the type of data by the unified cache in response to the cache hit rate ratio being greater than the second pre-determined threshold.

20 Claims, 6 Drawing Sheets

(56) References Cited

OTHER PUBLICATIONS

Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 3, 2017), from https://nutanixbible.com/.
Poitras, Steven. "The Nutanix Bible" (Sep. 4, 2015), from https://nutanixbible.com/.
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Jun. 9, 2016), from https://nutanixbible.com/.
Poitras, Steven. "The Nutanix Bible" (Jun. 8, 2017), from https://nutanixbible.com/.
Oitras, Steven. "The Nutanix Bible" (Jan. 3, 2018), from https://nutanixbible.com/.

* cited by examiner

MANAGEMENT OF CACHING OPERATIONS IN A UNIFIED CACHE

BACKGROUND

A virtual machine ("VM") may refer to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

Further details of aspects, objects, and advantages of the invention are described below in the detailed description, drawings, and claims. Both the foregoing general description and the following detailed description are exemplary and explanatory, and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

SUMMARY

Aspects of the present disclosure relate generally to a virtualization environment, and more particularly to a method by an improved unified cache management circuit allowing or preventing receipt by a unified cache of a type of data based on a cache hit rate ratio. According to illustrative embodiments described herein, a need exists to improve latency of virtual clusters, reduce network congestion, and improve network capacity in a virtualized environment.

Illustrative embodiments provide a technical solution by analyzing the cache hit rate ratio (CHRR) and preventing or allowing retrieval of data based on the CHRR value.

An exemplary embodiment herein is a method including comparing a cache hit rate ratio of a unified cache to a first pre-determined threshold, incrementing an alert counter in response to the cache hit rate ratio being lower than the first pre-determined threshold, comparing the alert counter to a pre-determined limit, preventing a first receipt of a type of data by the unified cache in response to the alert counter being equal to the pre-determined limit, causing a second receipt of metadata by the unified cache, comparing the cache hit rate ratio to a second pre-determined threshold, and allowing the first receipt of the type of data by the unified cache in response to the cache hit rate ratio being greater than the second pre-determined threshold.

Another embodiment is a system comprising a unified cache management circuit, wherein the unified cache management circuit is configured to compare a cache hit rate ratio of a unified cache to a first pre-determined threshold, increment an alert counter in response to the cache hit rate ratio being lower than the first pre-determined threshold, compare the alert counter to a pre-determined limit, prevent a first receipt of a type of data by the unified cache in response to the alert counter being equal to the pre-determined limit, cause a second receipt of metadata by the unified cache, compare the cache hit rate ratio to a second pre-determined threshold, and allow the first receipt of the type of data by the unified cache in response to the cache hit rate ratio being greater than the second pre-determined threshold.

Another embodiment is a non-transitory computer-readable storage medium having instructions stored thereon that, upon execution by a computing device, causes the computing device to perform operations including comparing a cache hit rate ratio of a unified cache to a first pre-determined threshold, incrementing an alert counter in response to the cache hit rate ratio being lower than the first pre-determined threshold, comparing the alert counter to a pre-determined limit, preventing a first receipt of a type of data by the unified cache in response to the alert counter being equal to the pre-determined limit, causing a second receipt of metadata by the unified cache, comparing the cache hit rate ratio to a second pre-determined threshold, and allowing the first receipt of the type of data by the unified cache in response to the cache hit rate ratio being greater than the second pre-determined threshold.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1A:
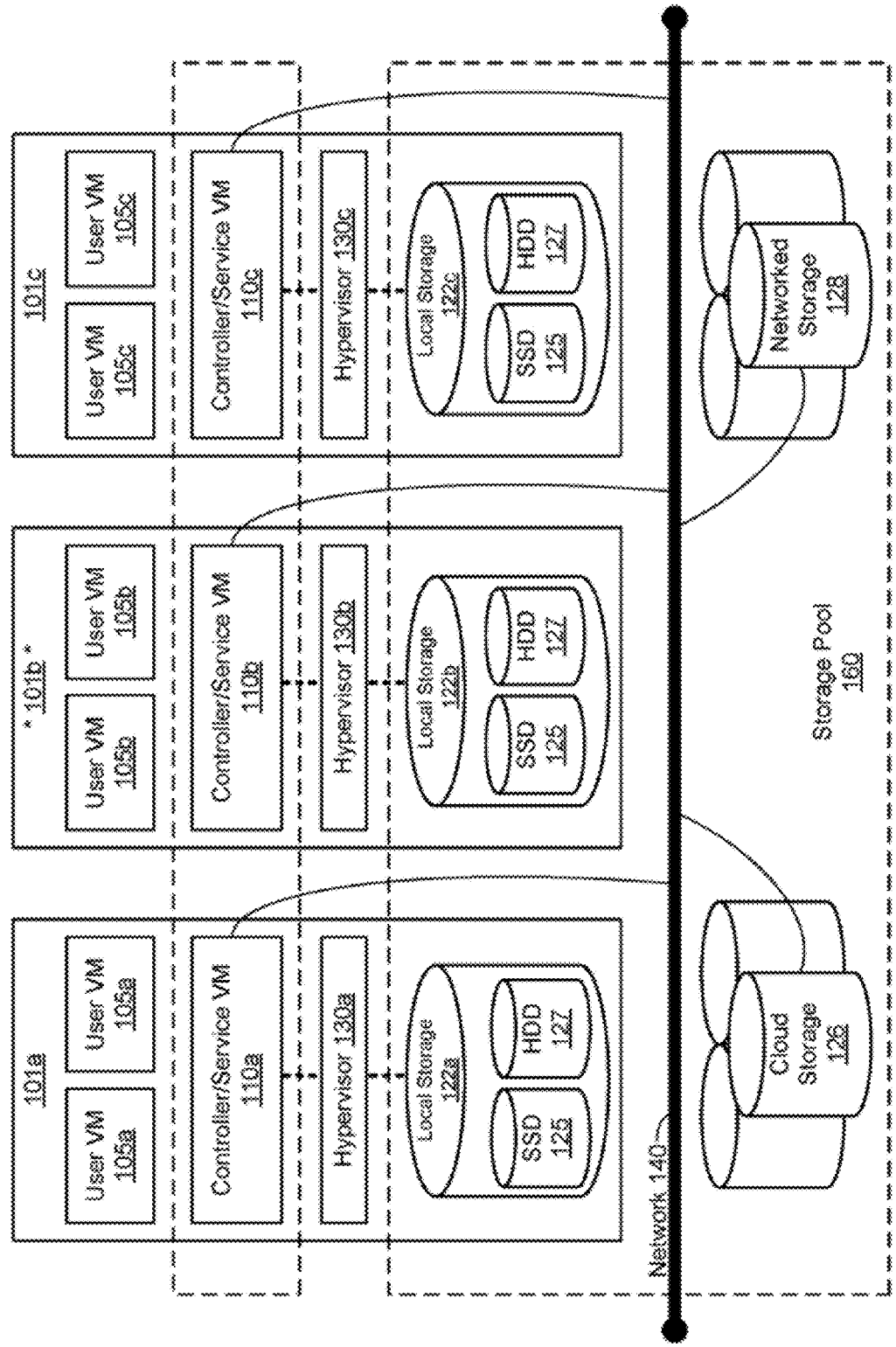
FIG. 1A is a system diagram illustrating a clustered virtualization environment in accordance with illustrative embodiments.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In conventional embodiments, a cache management circuit uses a least recently used (LRU) algorithm in order to manage a cache of information stored on a computer, such as in a virtualization environment. The cache management circuit uses an LRU algorithm to organize data in a queue and to correctly evict, or discard, items from the cache when the cache is full in a such a way that the likelihood of having to retrieve an item from a slower memory location, such as a database management system in comprising random-access memory (RAM) and/or read-only memory (ROM), is reduced.

However, problems arise when the cache is a unified cache comprising entries of various types and the cache management circuit has to manage the unified cache. In some embodiments, the entries comprise data entries and metadata entries. In the unified cache, there is a higher likelihood that insertion of one type of entry (i.e. data entry) may result in eviction of an entry of another type whose miss penalty is higher (i.e. metadata entry). If, suddenly, a continuous stream of the data entries enters the cache, then the metadata entries may get evicted out. Furthermore, data entries are much larger in size than metadata entries; hence, an insertion of a single data entry may result in multiple metadata entries to be evicted. The foregoing factors result in the unified cache management circuit making poor decisions by evicting large amounts of metadata prematurely. Then, when the unified cache management circuit receives a request for each evicted metadata, the unified cache management circuit has to query a database management system (for example, a distributed database management system) and retrieve each metadata from the database management system. The technical impact of the unified cache management circuit having to query for and retrieve the large amount of metadata from the database management system is that there is an increase in CPU read/write cycles, increased latency of entities such as virtual clusters for retrieving data across a network, thereby increasing network congestion in a virtualization environment.

Accordingly, this disclosure is directed towards a method by an improved unified cache management circuit allowing or preventing receipt by a unified cache of a type of data based on a cache hit rate ratio (CHRR). The improved unified cache management circuit compares the CHRR to a pre-determined threshold. If the CHRR is lower than the pre-determined threshold a pre-determined number of times, then the improved unified cache management circuit prevents receipt by the unified cache of data. Then, the improved unified cache management circuit causes the unified cache to receive metadata. Then, the improved unified cache management circuit compares the CHRR to a second pre-determined threshold. If the CHRR is equal to or above the second pre-determined threshold, then the improved unified cache management circuit allows receipt of data by the unified cache. One technical advantage of the foregoing improvement is a reduction in the number of CPU read/write cycles required to retrieve data across a network. Another technical advantage is the reduced latency of entities such as virtual cluster for retrieving data across a network in a virtualized environment. Latency can be reduced because the unified cache is much nearer to the virtual client than the database management system or other RAM or ROM where the missing metadata is stored. Another technical advantage is reduction of network congestion and in improvement of network capacity in a virtualization environment. The network congestion is reduced because requests sent across a network from the unified cache or unified cache management circuit to the database management system or less frequent. Yet another advantage of the foregoing improvement is that the improved caching reduces the workload of the database management system or other memory location that stores all the missing metadata.

Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization allows one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

Furthermore, there are now products that can aggregate multiple physical machines, running virtualization environments to not only utilize the processing power of the physical devices to aggregate the storage of the individual physical devices to create a logical storage pool wherein the data may be distributed across the physical devices but appears to the virtual machines to be part of the system that the virtual machine is hosted on. Such systems operate under the covers by using metadata, which may be distributed and replicated any number of times across the system, to locate the indicated data. These systems are commonly referred to as clustered systems, wherein the resources of the group are pooled to provide logically combined, but physically separate systems.

FIG. 1A illustrates a clustered virtualization environment 100 according to particular embodiments. The architecture of FIG. 1A can be implemented for a distributed platform that contains multiple host machines 101a-c that manage multiple tiers of storage. The multiple tiers of storage may include storage that is accessible through network 140, such as, by way of example and not limitation, cloud storage 126 (e.g., which may be accessible through the Internet), network-attached storage (NAS) 128 (e.g., which may be accessible through a LAN), or a storage area network (SAN). Unlike the prior art, the present embodiment also permits local storage 122a-c that is incorporated into or directly attached to the host machine and/or appliance to be managed as part of storage pool 160. Examples of such local storage include Solid State Drives 125 (henceforth "SSDs"), Hard Disk Drives 127 (henceforth "HDDs" or "spindle drives"), optical disk drives, external drives (e.g., a storage device connected to a host machine via a native drive interface or a serial attached SCSI interface), or any other direct-attached storage. These storage devices, both direct-attached and network-accessible, collectively form storage pool 160. Virtual disks (or "vDisks") may be structured from the physical storage devices in storage pool 160, as described in more detail below. As used herein, the term vDisk refers to the storage abstraction that is exposed by a Controller/Service VM (CVM) 110 to be used by a user VM 105. In particular embodiments, the vDisk may be exposed via iSCSI ("internet small computer system interface") or NFS ("network file system") and is mounted as a virtual disk on the user VM. In particular embodiments, vDisks may be organized into one or more volume groups (VGs).

Each host machine 101*a-c* may run virtualization software, such as VMWARE ESX(I), MICROSOFT HYPER-V, or REDHAT KVM. The virtualization software includes hypervisor 130*a-c* to create, manage, and destroy user VMs 105, as well as managing the interactions between the underlying hardware and user VMs 105. User VMs 105 may run one or more applications that may operate as "clients" with respect to other elements within virtualization environment 100. Though not depicted in FIG. 1A, a hypervisor may connect to network 140. In particular embodiments, a host machine 101 may be a physical hardware computing device; in particular embodiments, a host machine 101 may be a virtual machine.

CVMs 110*a-c* are used to manage storage and input/output ("I/O") activities according to particular embodiments. These special VMs act as the storage controller in the currently described architecture. Multiple such storage controllers may coordinate within a cluster to form a unified storage controller system. CVMs 110 may run as virtual machines on the various host machines 101, and work together to form a distributed system 110 that manages all the storage resources, including local storage 122, NAS 128, and cloud storage 126. The CVMs may connect to network 140 directly, or via a hypervisor. Since the CVMs run independent of hypervisors 130*a-c*, this means that the current approach can be used and implemented within any virtual machine architecture, since the CVMs of particular embodiments can be used in conjunction with any hypervisor from any virtualization vendor.

A host machine may be designated as a leader node within a cluster of host machines. For example, host machine 101*b*, as indicated by the asterisks, may be a leader node. A leader node may have a software component designated to perform operations of the leader. For example, CVM 110*b* on host machine 101*b* may be designated to perform such operations. A leader may be responsible for monitoring or handling requests from other host machines or software components on other host machines throughout the virtualized environment. If a leader fails, a new leader may be designated. In particular embodiments, a management module (e.g., in the form of an agent) may be running on the leader node.

Each CVM 110*a-c* exports one or more block devices or NFS server targets that appear as disks to user VMs 105*a-c*. These disks are virtual, since they are implemented by the software running inside CVMs 110*a-c*. Thus, to user VMs 105*a-c*, CVMs 110*a-c* appear to be exporting a clustered storage appliance that contains some disks. All user data (including the operating system) in the user VMs 105*a-c* and reside on these virtual disks.

Significant performance advantages can be gained by allowing the virtualization system to access and utilize local storage 122 as disclosed herein. This is because I/O performance is typically much faster when performing access to local storage 122 as compared to performing access to NAS 128 across a network 140. This faster performance for locally attached storage 122 can be increased even further by using certain types of optimized local storage devices, such as SSDs. Further details regarding methods and mechanisms for implementing the virtualization environment illustrated in FIG. 1A are described in U.S. Pat. No. 8,601,473, which is hereby incorporated by reference in its entirety.

Figure 1B:
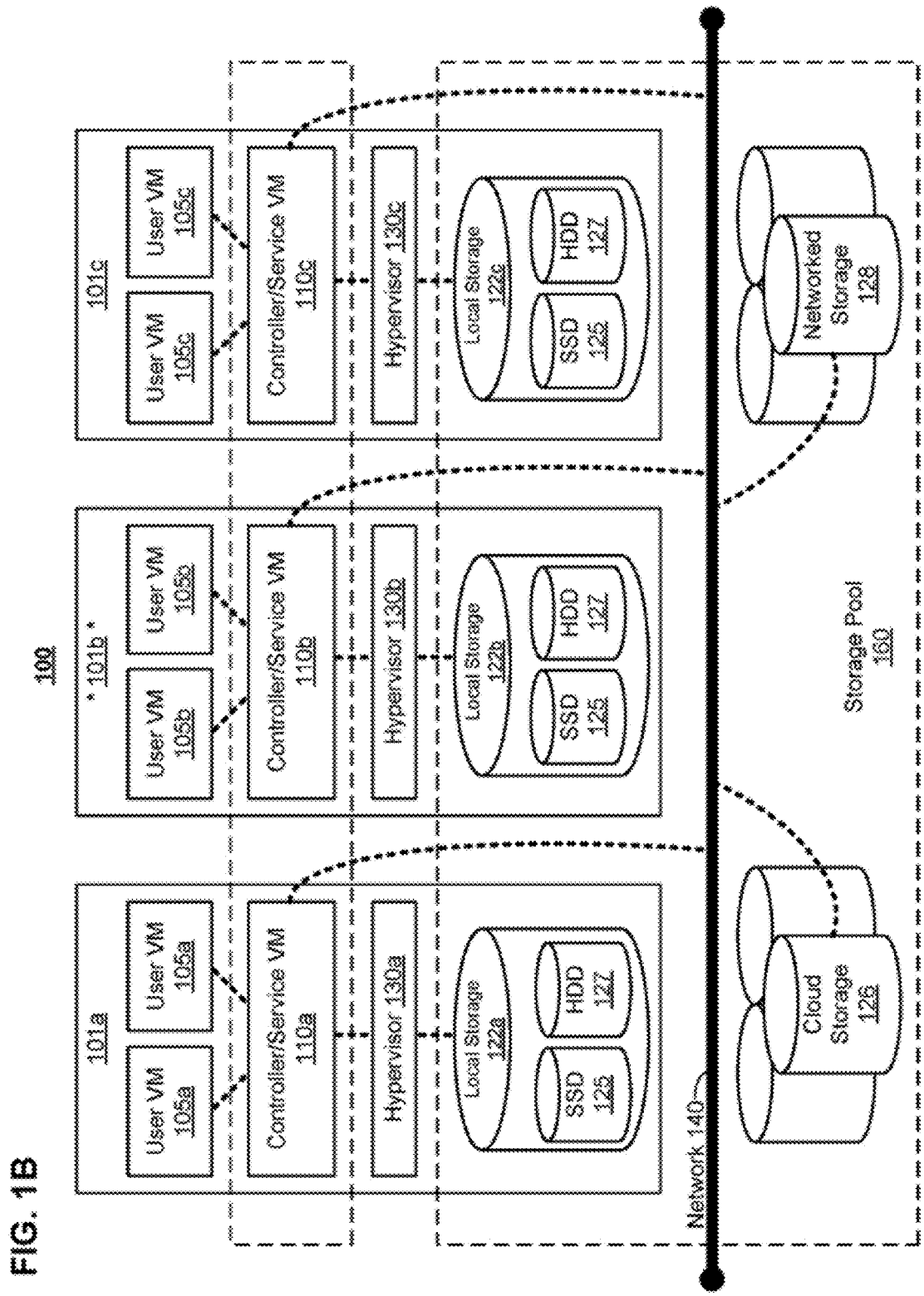
FIG. 1B is a system diagram illustrating data flow within a clustered virtualization environment in accordance with illustrative embodiments.

FIG. 1B illustrates data flow within an example clustered virtualization environment 100 according to particular embodiments. As described above, one or more user VMs and a CVM may run on each host machine 101 along with a hypervisor. As a user VM performs I/O operations (e.g., a read operation or a write operation), the I/O commands of the user VM may be sent to the hypervisor that shares the same server as the user VM. For example, the hypervisor may present to the virtual machines an emulated storage controller, receive an I/O command and facilitate the performance of the I/O command (e.g., via interfacing with storage that is the object of the command, or passing the command to a service that will perform the I/O command). An emulated storage controller may facilitate I/O operations between a user VM and a vDisk. A vDisk may present to a user VM as one or more discrete storage drives, but each vDisk may correspond to any part of one or more drives within storage pool 160. Additionally or alternatively, CVM 110*a-c* may present an emulated storage controller either to the hypervisor or to user VMs to facilitate I/O operations. CVM 110*a-c* may be connected to storage within storage pool 160. CVM 110*a* may have the ability to perform I/O operations using local storage 122*a* within the same host machine 101*a*, by connecting via network 140 to cloud storage 126 or NAS 128, or by connecting via network 140 to local storage 122*b-c* within another host machine 101*b-c* (e.g., via connecting to another CVM 110*b* or 110*c*). In particular embodiments, any suitable computing system 500 may be used to implement a host machine 101.

Figure 2:
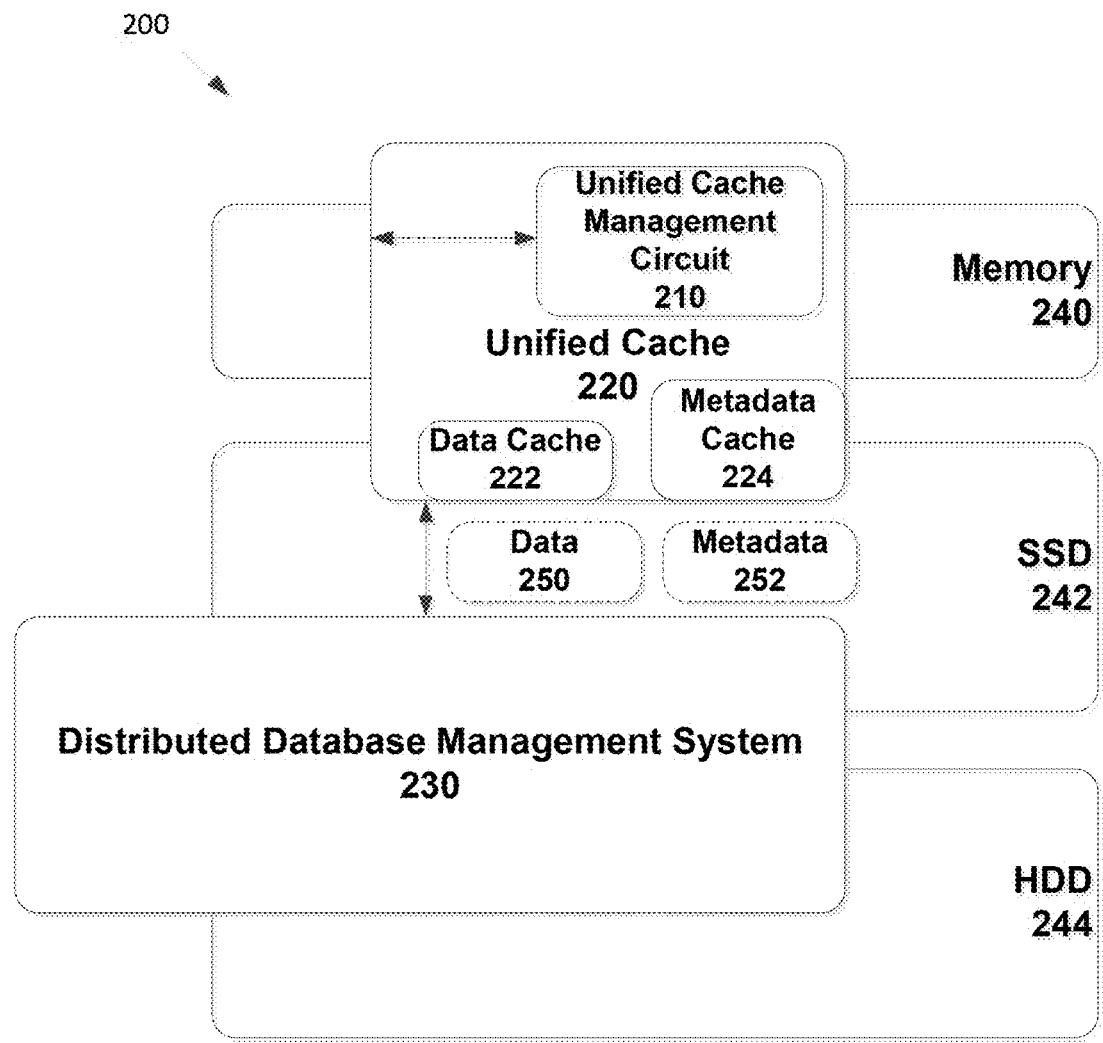
FIG. 2 is a system diagram illustrating a unified cache management environment.

FIG. 2 illustrates a unified cache management environment 200. A unified cache management circuit 210 is coupled to a unified cache 220. The unified cache 220 retrieves items, stores items, and evicts items based on decisions made by the unified cache management circuit 210. In some embodiments, the unified cache management circuit 210 and the unified cache 220 resides in a controller virtual machine's (CVM's) memory 240 (for example, memory of CVM 110*a* in FIG. 1A). In other embodiments, the unified cache management circuit 210 and the unified cache 229 reside in a SSD 242 (for example, SSD 125 in FIG. 1A). In some embodiments, the unified cache management circuit 210 and the unified cache 220 are on a host of a cloud provider owned data center (for example, the host 101*a*). In yet other embodiments, the unified cache management circuit is implemented in software.

In some embodiments, the unified cache 220 contains data cache 222 which includes data entries. Data entries are created when the unified cache 220 retrieves data 250 from the distributed database management system 230. In further embodiments, the data cache is deduplicated-data cache. In the deduplicated-data cache, extra copies of the same data 250 are deleted, leaving only one copy to be stored.

In some embodiments, the unified cache 220 also contains metadata cache 224 which includes metadata entries. Metadata entries are created when the unified cache 220 retrieves metadata 252 from the distributed database management system 230. In some embodiments, the contents of the metadata cache 224 are information about the data that is stored in SSD 242, HDD 244, or both. Although not in the illustrative embodiment, it is also possible that the contents of metadata cache 224 are directory contents, file status information such as timestamp, size, author, and permission bits; and file system structures. In some embodiments, the unified cache contains data cache 222 and metadata cache 224.

In some embodiments, upon a read request of data not present in the unified cache 220, the data 250 is retrieves from the distributed database management system 230 and places into the single-touch pool (not shown) in the memory 240 of the unified cache 220. As part of the LRU algorithm, an LRU counter is assigned. As other data is requested, the LRU counter increases and the data 250 moves down the LRU queue until it is evicted from the unified cache 220. Any subsequent read request places the data 250 into the in the memory 240 portion of the multi-touch pool (not shown) of the unified cache 220. If evicted according to the LRU algorithm, the data 250 moves to the SSD 240 portion of the multi-touch pool (not shown) of the unified cache 220. If evicted according to the LRU algorithm, the data 250 moves into the distributed database management system 230.

A distributed database management system 230 is coupled to the unified cache 220. The distributed database management system 230 stores data 250 and metadata 252 which is evicted from unified cache 220. In some embodiments, the distributed database management system 230 resides in SSD 242 (for example, SSD 125 in FIG. 1A). In other embodiments, the distributed database management system 230 resides in HDD 244 (for example, HDD 127 in FIG. 1A).

Figure 3:
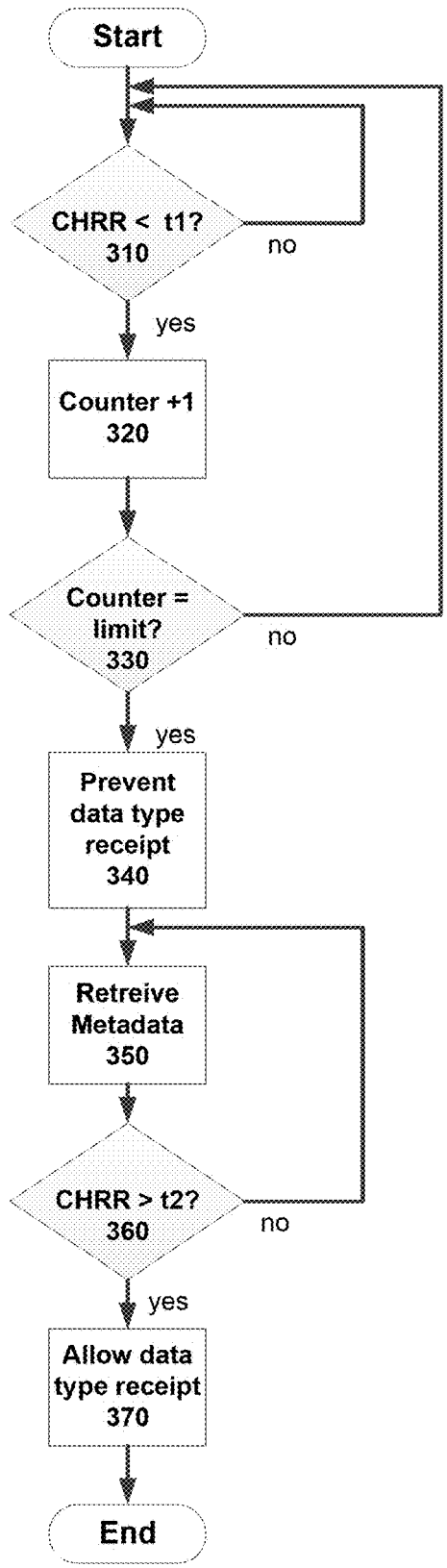
FIG. 3 is a flow chart illustrating a method for managing the unified cache by the improved unified cache management circuit.

FIG. 3 illustrates a method of managing the unified cache 220 by the improved unified cache management circuit 210. Additional, fewer, or different operations may be performed depending on the particular implementation of the method. At operation 310, the improved unified cache management circuit 210 compares the CHRR to a pre-determined threshold t1. If the CHRR is less than the t1, then, at operation 320, improved unified cache management circuit 210 increases a CHRR alert counter by 1. If the CHRR is not less than the pre-determined threshold, then the method returns to operation 310. Upon completion of operation 320, at operation 330, the improved unified cache management circuit 210 compares the CHRR alert counter to a pre-determined limit. If the CHRR alert counter is equal to the pre-determined limit, then, at operation 340, the improved unified cache management circuit 210 performs prevents the receipt by the unified cache 220 of a type data 250, in response to the CHRR alert counter being equal to the pre-determined limit. If the CHRR alert counter is below the pre-determined limit, then the method returns to operation 310. Upon completion of operation 340, at operation 350, the improved unified cache management circuit 210 causes the unified cache 220 to retrieve metadata 252 from the distributed database management system 230. In operation 360, the improved unified cache management circuit 210 compares the CHRR to a second pre-determined threshold t2. If the CHRR is above t2, then, at operation 370, the improved unified cache management circuit 210 allows receipt by the unified cache 220 of the type of data 250. If the CHRR is not above the second pre-determined threshold, then the method returns to operation 350.

Figure 4:
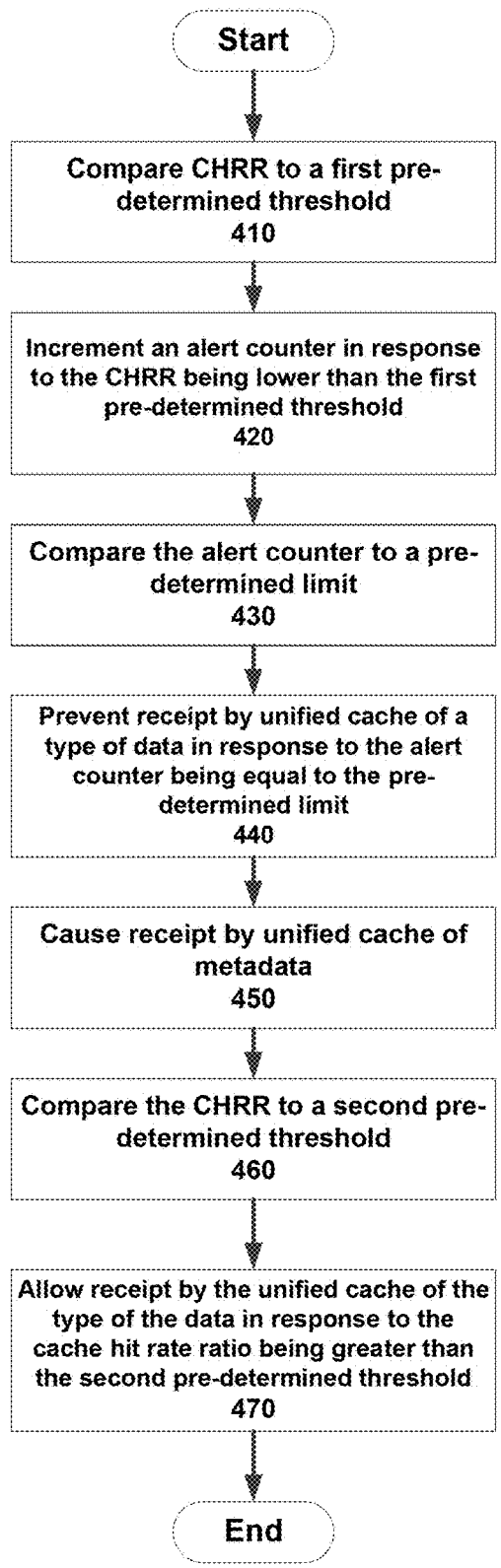
FIG. 4 is a block diagram illustrating a method for managing the unified cache by the improved unified cache management circuit.

FIG. 4 illustrates a method of managing the unified cache 220 by the improved unified cache management circuit 210. Additional, fewer, or different operations may be performed depending on the particular implementation of the method. At operation 410, the improved unified cache management circuit 210 compares a CHRR of a unified cache to a first pre-determined threshold. At operation 420, the improved unified cache management circuit 210 increments a CHRR alert counter, in response to the CHRR being lower than the first pre-determined threshold. At operation 430, improved unified cache management circuit 210 compares the CHRR alert counter to a pre-determined limit. At operation 440, improved unified cache management 210 circuit prevents receipt by the unified cache 220 of a type of data 250, in response to the CHRR alert counter being equal to the pre-determined limit. At operation 450, improved unified cache management circuit 210 causes the unified cache 220 to retrieve metadata 252. At operation 460, the improved unified cache management circuit 210 compares the CHRR to a second pre-determined threshold. At operation 470, improved unified cache management circuit 210 allows the receipt by the unified cache 220 of the type of data 250, in response to the cache hit rate ratio being greater than the second pre-determined threshold.

In some embodiments, operations 440 and 470 (preventing and allowing receipt by the unified cache 220 of a type of data 250) only applies data insertions; that is, operations 440 and 470 only applies to the type of data for which new data entries need to be created. In other embodiments, operations 440 and 470 do not apply to the type of data for which only updates to existing entries are required. In other embodiments, operations 440 and 470 do not apply to the type of data which is received in the read-ahead cache (not shown). In some embodiments, the CHRR is observed by polling a register continuously. In other embodiments, the CHRR is observed by interrupts, wherein the interrupt occurs when a data entry is created. In some embodiments, the first pre-determined threshold that is compared to the CHRR for the purpose of preventing receipt by the unified cache 220 of data 250 is different than the second pre-determined threshold that is compared to the CHRR for the purpose of allowing receipt by the unified cache 220 of data 250.

Figure 5:
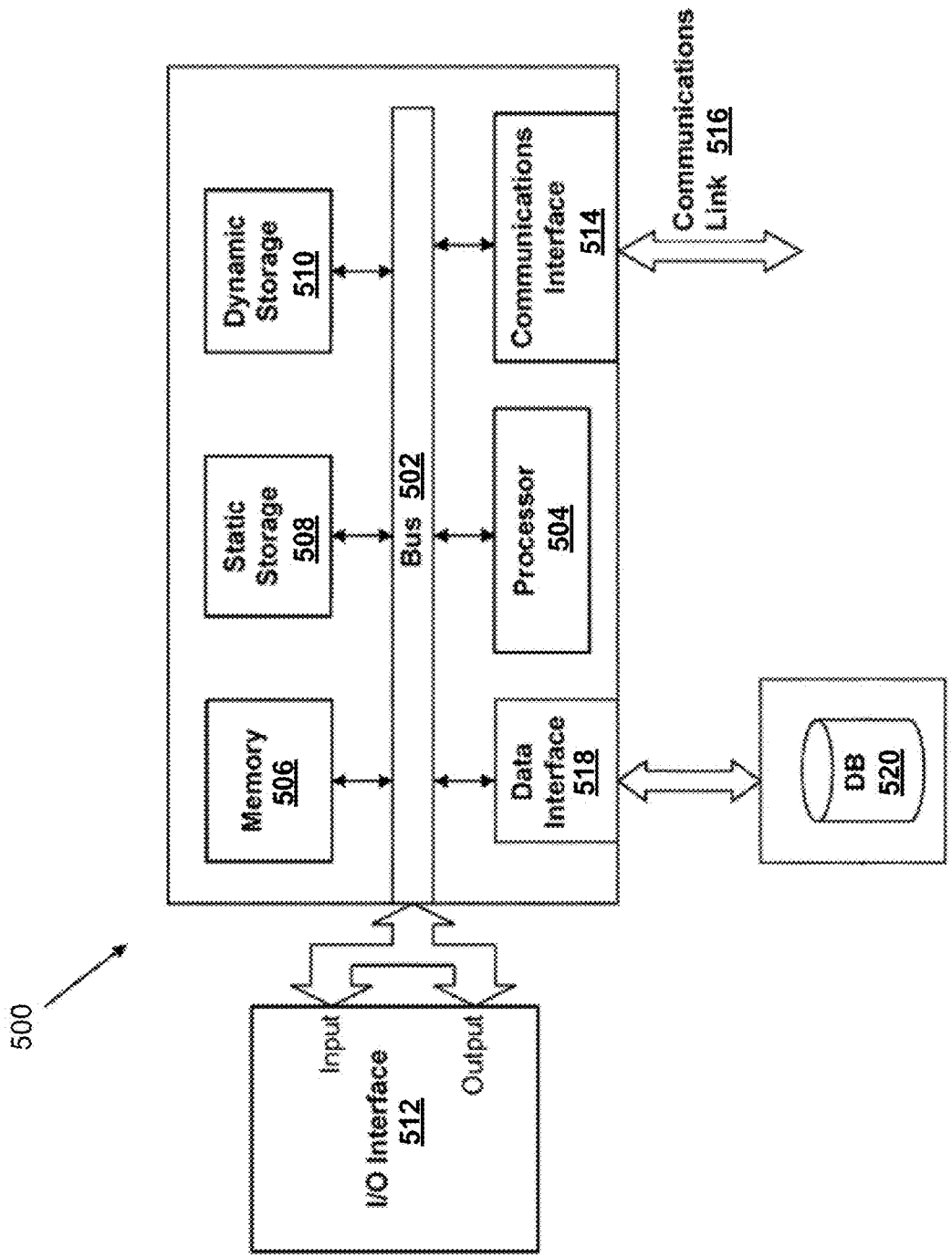
FIG. 5 is a block diagram of a computing system suitable for implementing particular embodiments disclosed herein.

FIG. 5 is a block diagram of an illustrative computing system 500 suitable for implementing particular embodiments. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a mainframe, a mesh of computer systems, a server, a laptop or notebook computer system, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

Computer system 500 includes a bus 502 (e.g., an address bus and a data bus) or other communication mechanism for communicating information, which interconnects subsystems and devices, such as processor 504, memory 506 (e.g., RAM), static storage 508 (e.g., ROM), dynamic storage 510 (e.g., magnetic or optical), communication interface 514 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), input/output (I/O) interface 512 (e.g., keyboard, keypad, mouse, microphone). In particular embodiments, computer system 500 may include one or more of any such components.

In particular embodiments, processor 504 includes hardware for executing instructions, such as those making up a computer program. As an example and not by way of limitation, to execute instructions, processor 504 may retrieve (or fetch) the instructions from an internal register, an internal cache, memory 506, static storage 508, or dynamic storage 510; decode and execute them; and then write one or more results to an internal register, an internal cache, memory 506, static storage 508, or dynamic storage 510. In particular embodiments, processor 504 may include one or more internal caches for data, instructions, or addresses. This disclosure contemplates processor 504 including any suitable number of any suitable internal caches, where appropriate. As an example and not by way of limitation, processor 504 may include one or more instruction caches, one or more data caches, and one or more translation lookaside buffers (TLBs). Instructions in the instruction caches may be copies of instructions in memory 506, static storage 508, or dynamic storage 510, and the instruction caches may speed up retrieval of those instructions by processor 504. Data in the data caches may be copies of data in memory 506, static storage 508, or dynamic storage 510 for instructions executing at processor 504 to operate on; the results of previous instructions executed at processor 504 for access by subsequent instructions executing at processor 504 or for writing to memory 506, static storage 508, or dynamic storage 510; or other suitable data. The data caches may speed up read or write operations by processor 504. The TLBs may speed up virtual-address translation for processor 504. In particular embodiments, processor 504 may include one or more internal registers for data, instructions, or addresses. This disclosure contemplates processor 504 including any suitable number of any suitable internal registers, where appropriate. Where appropriate, processor 504 may include one or more arithmetic logic units (ALUs); be a multi-core processor; or include one or more processors 504. Although this disclosure describes and illustrates a particular processor, this disclosure contemplates any suitable processor.

In particular embodiments, I/O interface 512 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 512 for them. Where appropriate, I/O interface 512 may include one or more device or software drivers enabling processor 504 to drive one or more of these I/O devices. I/O interface 512 may include one or more I/O interfaces 512, where appropriate. Although this disclosure describes and illustrates a particular I/O interface, this disclosure contemplates any suitable I/O interface.

In particular embodiments, communication interface 514 includes hardware, software, or both providing one or more interfaces for communication (such as, for example, packet-based communication) between computer system 500 and one or more other computer systems 500 or one or more networks. As an example and not by way of limitation, communication interface 514 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 514 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 514 for any of these networks, where appropriate. Communication interface 514 may include one or more communication interfaces 514, where appropriate. Although this disclosure describes and illustrates a particular communication interface, this disclosure contemplates any suitable communication interface.

One or more memory buses (which may each include an address bus and a data bus) may couple processor 504 to memory 506. Bus 502 may include one or more memory buses, as described below. In particular embodiments, one or more memory management units (MMUs) reside between processor 504 and memory 506 and facilitate accesses to memory 506 requested by processor 504. In particular embodiments, memory 506 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 506 may include one or more memories 506, where appropriate. Although this disclosure describes and illustrates particular memory, this disclosure contemplates any suitable memory.

Where appropriate, the ROM may be mask-programmed ROM, programmable ROM (PROM), erasable PROM (EPROM), electrically erasable PROM (EEPROM), electrically alterable ROM (EAROM), or flash memory or a combination of two or more of these. In particular embodiments, dynamic storage 510 may include a hard disk drive (HDD), a floppy disk drive, flash memory, an optical disc, a magneto-optical disc, magnetic tape, or a Universal Serial Bus (USB) drive or a combination of two or more of these. Dynamic storage 510 may include removable or non-removable (or fixed) media, where appropriate. Dynamic storage 510 may be internal or external to computer system 500, where appropriate. This disclosure contemplates mass dynamic storage 510 taking any suitable physical form. Dynamic storage 510 may include one or more storage control units facilitating communication between processor 504 and dynamic storage 510, where appropriate.

In particular embodiments, bus 502 includes hardware, software, or both coupling components of computer system 500 to each other. As an example and not by way of limitation, bus 502 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 502 may include one or more buses 502, where appropriate. Although this disclosure describes and illustrates a particular bus, this disclosure contemplates any suitable bus or interconnect.

According particular embodiments, computer system 500 performs specific operations by processor 504 executing one or more sequences of one or more instructions contained in memory 506. Such instructions may be read into memory 506 from another computer readable/usable medium, such as static storage 508 or dynamic storage 510. In alternative embodiments, hard-wired circuitry may be used in place of or in combination with software instructions to implement particular embodiments. Thus, particular embodiments are not limited to any specific combination of hardware circuitry and/or software. In particular embodiments, the term "logic" shall mean any combination of software or hardware that is used.

The term "computer readable medium" or "computer usable medium" as used herein refers to any medium that participates in providing instructions to processor 504 for execution. Such a medium may take many forms, including but not limited to, nonvolatile media and volatile media. Non-volatile media includes, for example, optical or magnetic disks, such as static storage 508 or dynamic storage 510. Volatile media includes dynamic memory, such as memory 506.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In particular embodiments, execution of the sequences of instructions may be performed by a single computer system 500; in alternative embodiments, two or more computer systems 500 coupled by communication link 516 (e.g., LAN, PTSN, or wireless network) may perform the sequence of instructions in coordination with one another.

Computer system 500 may transmit and receive messages, data, and instructions, including program, i.e., application code, through communication link 516 and communication interface 514. Received program code may be executed by processor 504 as it is received, and/or stored in static storage 508 or dynamic storage 510, or other non-volatile storage for later execution. A database 520 may be used to store data accessible by the system 500 by way of data interface 518.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDS), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   determining, by a unified cache management circuit, that a cache hit rate ratio of a unified cache is lower than a first pre-determined threshold;
   preventing, by the unified cache management circuit, a first receipt of a type of data by the unified cache in response to determining that a number of times the cache hit rate ratio is lower than the first pre-determined threshold is equal to a pre-determined limit; and allowing, by the unified cache management circuit, the first receipt of the type of data by the unified cache in response to the cache hit rate ratio being greater than a second pre-determined threshold.

2. The method of claim 1, wherein the type of the data is defined by requiring creation of a data entry.

3. The method of claim 1, further comprising causing, by the unified cache management circuit, a second receipt of metadata by the unified cache in response to determining that the number of times the cache hit rate ratio is lower than the first pre-determined threshold is equal to the pre-determined limit,
wherein the metadata to be retrieved is located in a distributed database management system.

4. The method of claim 1, wherein the cache hit rate ratio is determined by polling a register within a pre-determined amount of time.

5. The method of claim 1, wherein the cache hit rate ratio is determined in response to an interrupt, and wherein the interrupt occurs when a data entry is created.

6. The method of claim 1, further comprising:
comparing, by the unified cache management circuit, the cache hit rate ratio with the first pre-determined threshold; and
incrementing, by the unified cache management circuit, an alert counter in response to the cache hit rate ratio being lower than the first pre-determined threshold.

7. The method of claim 6, further comprising comparing, by the unified cache management circuit, the alert counter to the pre-determined limit.

8. An apparatus comprising:
a processor having programmed instructions to:
determine that a cache hit rate ratio of a unified cache is lower than a first pre-determined threshold;
prevent a first receipt of a type of data by the unified cache in response to determining that a number of times the cache hit rate ratio is lower than the first pre-determined threshold is equal to a pre-determined limit; and
allow the first receipt of the type of the data by the unified cache in response to the cache hit rate ratio being greater than a second pre-determined threshold.

9. The apparatus of claim 8, wherein the type of the data is defined by requiring creation of a data entry.

10. The apparatus of claim 8, wherein the programmed instructions further cause a second receipt of metadata by the unified cache in response to determining that the number of times the cache hit rate ratio is lower than the first pre-determined threshold is equal to the pre-determined limit, and
wherein the metadata to be retrieved is located in a distributed database management system.

11. The apparatus of claim 8, wherein the cache hit rate ratio is determined by polling a register within a pre-determined amount of time.

12. The apparatus of claim 8, wherein the cache hit rate ratio is determined in response to an interrupt, and wherein the interrupt occurs when a data entry is created.

13. The apparatus of claim 8, wherein the programmed instructions:
compare the cache hit rate ratio with the first pre-determined threshold; and
increment an alert counter in response to the cache hit rate ratio being lower than the first pre-determined threshold.

14. The apparatus of claim 8, wherein an alert counter is incremented each time the cache hit rate ratio is lower than the first pre-determined threshold, and wherein the alert counter is compared with the pre-determined limit.

15. A non-transitory computer-readable storage medium having instructions stored thereon that, upon execution by a computing device, causes the computing device to perform operations comprising:
determining that a cache hit rate ratio of a unified cache is lower than a first pre-determined threshold;
preventing a first receipt of a type of data by the unified cache in response to determining that a number of times the cache hit rate ratio is lower than the first pre-determined threshold is equal to a pre-determined limit; and
allowing the first receipt of the type of data by the unified cache in response to the cache hit rate ratio being greater than a second pre-determined threshold.

16. The non-transitory computer-readable storage medium of claim 11, wherein the type of the data is defined by requiring creation of a data entry.

17. The non-transitory computer-readable storage medium of claim 15, further comprising causing a second receipt of metadata by the unified cache in response to determining that the number of times the cache hit rate ratio is lower than the first pre-determined threshold is equal to the pre-determined limit,
wherein the metadata to be retrieved is located in a distributed database management system.

18. The non-transitory computer-readable storage medium of claim 15, wherein the cache hit rate ratio is determined by polling a register within a pre-determined amount of time.

19. The non-transitory computer-readable storage medium of claim 15, wherein the cache hit rate ratio is determined in response to an interrupt, and wherein the interrupt occurs when a data entry is created.

20. The non-transitory computer-readable storage medium of claim 15, further comprising:
comparing the cache hit rate ratio with the first pre-determined threshold;
incrementing an alert counter in response to the cache hit rate ratio being lower than the first pre-determined threshold; and
comparing the alert counter to the pre-determined limit.

* * * * *